US004001744B2

United States Statutory Invention Registration [19]

[11] Reg. Number: H1744

Clayton et al.

[45] Published: Aug. 4, 1998

[54] WIRELESS REMOTE SENSING THERMOMETER

[76] Inventors: Stanley R. Clayton, 3709 Seventh Ave. #3, San Diego, Calif. 92103; Mark R. Roser, 3050 Rue D'Orleans #209, San Diego, Calif. 92110; Stephen D. Russell, 4561 Osprey St., San Diego, Calif. 92107; Randy L. Shimabukuro, 3098 Rue D'Orleans #302, San Diego, Calif. 92110

[21] Appl. No.: 532,944

[22] Filed: Sep. 21, 1995

[51] Int. Cl.[6] ..... G01K 11/22; G01K 7/00

[52] U.S. Cl. ..... 374/117; 374/170; 340/870.17; 331/57; 331/66

[58] Field of Search ..... 374/117, 170, 374/163; 340/870.17, 870.26; 331/66, 57

[56] References Cited

U.S. PATENT DOCUMENTS

| | | | |
|---|---|---|---|
| 3,596,262 | 7/1971 | Rollwitz et al. | 374/184 |
| 3,971,362 | 7/1976 | Pope et al. | 340/870.17 |
| 4,025,912 | 5/1977 | Rice | 340/870.17 |
| 4,140,999 | 2/1979 | Conway | 340/870.17 |
| 4,297,557 | 10/1981 | Tyler et al. | 331/66 |
| 4,448,549 | 5/1984 | Hashimoto et al. | 374/170 |
| 4,471,354 | 9/1984 | Smith | 340/870.17 |
| 4,549,818 | 10/1985 | Nishikubo et al. | 331/66 |
| 4,658,407 | 4/1987 | Iwama | 374/170 |
| 4,689,621 | 8/1987 | Kleinberg | 331/66 |
| 4,874,252 | 10/1989 | Ziegler et al. | 374/117 |
| 4,918,423 | 4/1990 | Fukuyama et al. | 340/442 |
| 5,214,668 | 5/1993 | Satou et al. | 374/117 |
| 5,374,822 | 12/1994 | Steinke et al. | 374/176 |

*Primary Examiner*—Charles T. Jordan
*Assistant Examiner*—Meena Chelliah

[57] ABSTRACT

A temperature measuring device comprises a ring oscillator having a nominal oscillating frequency positioned at a location where temperature is to be measured. The ring oscillator emits electromagnetic radiation to an antenna located at a convenient distance from the ring oscillator. The antenna transforms the electromagnetic radiation into an electrical signal. A receiver receives the electrical signal and measures the frequency of the electrical signal to determine the corresponding temperature. The temperature may then be visually monitored from a display or electronically monitored by other devices.

7 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WIRELESS REMOTE SENSING THERMOMETER

BACKGROUND OF THE INVENTION

The present invention relates to a ring oscillator that senses temperature and transmits temperature information to a radio receiver.

Thermometric oscillators are one of many devices used to sense temperature. Other temperature sensing devices include thermocouples, resistance temperature detectors, and junction diodes. Typically these devices are placed in close proximity to the point where the measurement is desired and are connected by wires to other electronic components that process the output of the sensing device. In many applications, however, the wires connecting to the sensing device are inconvenient. In a production line, for example, the sensing device may be moving while the other components preferably remain stationary. In other applications, a temperature sensing point may be difficult to access, such as inside a nuclear reactor or some other harsh environment, where wired connections may be inconvenient.

Another disadvantage is that the temperature range of the sensing device may not extend to the range of interest.

Optical pyrometry is a well known technique for measuring temperature that does not require connecting wires to the point of measurement. Optical pyrometers measure the intensity of electromagnetic radiation from an object to determine temperature. However, the accuracy of the temperature measurement is dependent on the accuracy of the emissivity given for the object. Also, intervening material between the object and the pyrometer may distort the temperature measurement. Furthermore, optical pyrometry is currently limited to elevated temperatures where emissivity is high.

SUMMARY OF THE INVENTION

The thermometric ring oscillator of the present invention addresses the problems described above, and may provide further related advantages. The following description of a thermometric ring oscillator does not preclude other embodiments and advantages of the present invention that may exist or become obvious to those skilled in the art.

A temperature measuring device comprises a ring oscillator having a nominal oscillating frequency positioned at a location where temperature is to be measured. The ring oscillator emits electromagnetic radiation to an antenna located at a convenient distance from the ring oscillator. The antenna transforms the electromagnetic radiation into an electrical signal. A receiver receives the electrical signal and measures the frequency of the electrical signal to determine the corresponding temperature. The temperature may then be visually monitored from a display or electronically monitored by other devices.

An advantage of the thermometric ring oscillator is that both temperature sensing and wireless transmission of temperature data are performed with a minimum of parts.

Another advantage is that the thermometric ring oscillator may be incorporated with other electronic devices and circuits for measuring temperature under actual operating conditions.

A further advantage is that the thermometric ring oscillator may be miniaturized by standard microelectronic fabrication techniques to allow maximum thermal coupling.

Still another advantage is that the frequency of the ring oscillator may readily be measured to 1 part in $10^{11}$, thus making possible extremely precise temperature measurements.

The features and advantages summarized above in addition to other aspects of the present invention will become more apparent from the description, presented in conjunction with the following drawings.

DESCRIPTION OF THE INVENTION

The following description is presented solely for the purpose of disclosing how the present invention may be made and used. The scope of the invention is defined by the claims.

Figure 1:
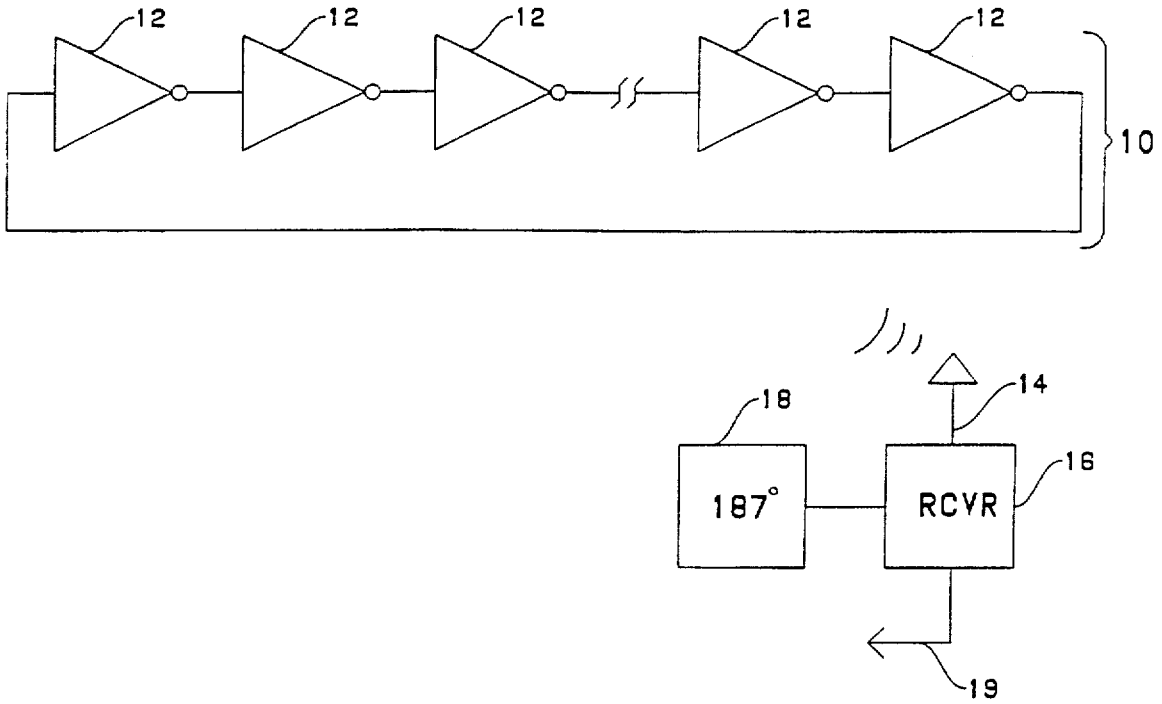
FIG. 1 is a circuit diagram of the thermometric ring oscillator.
Figure 3:
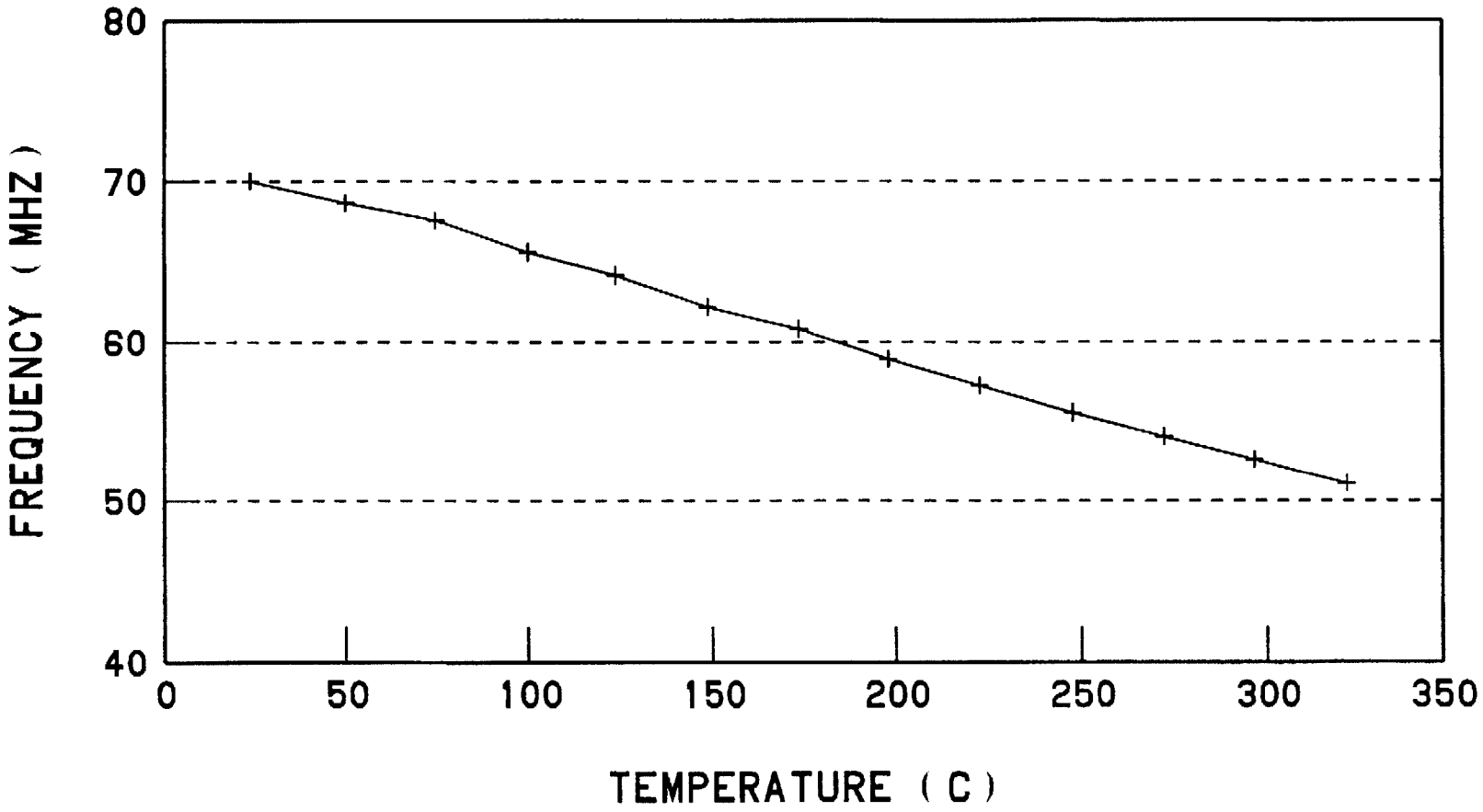
FIG. 3 is an example of ring oscillator frequency versus temperature for higher temperatures.
Figure 4:
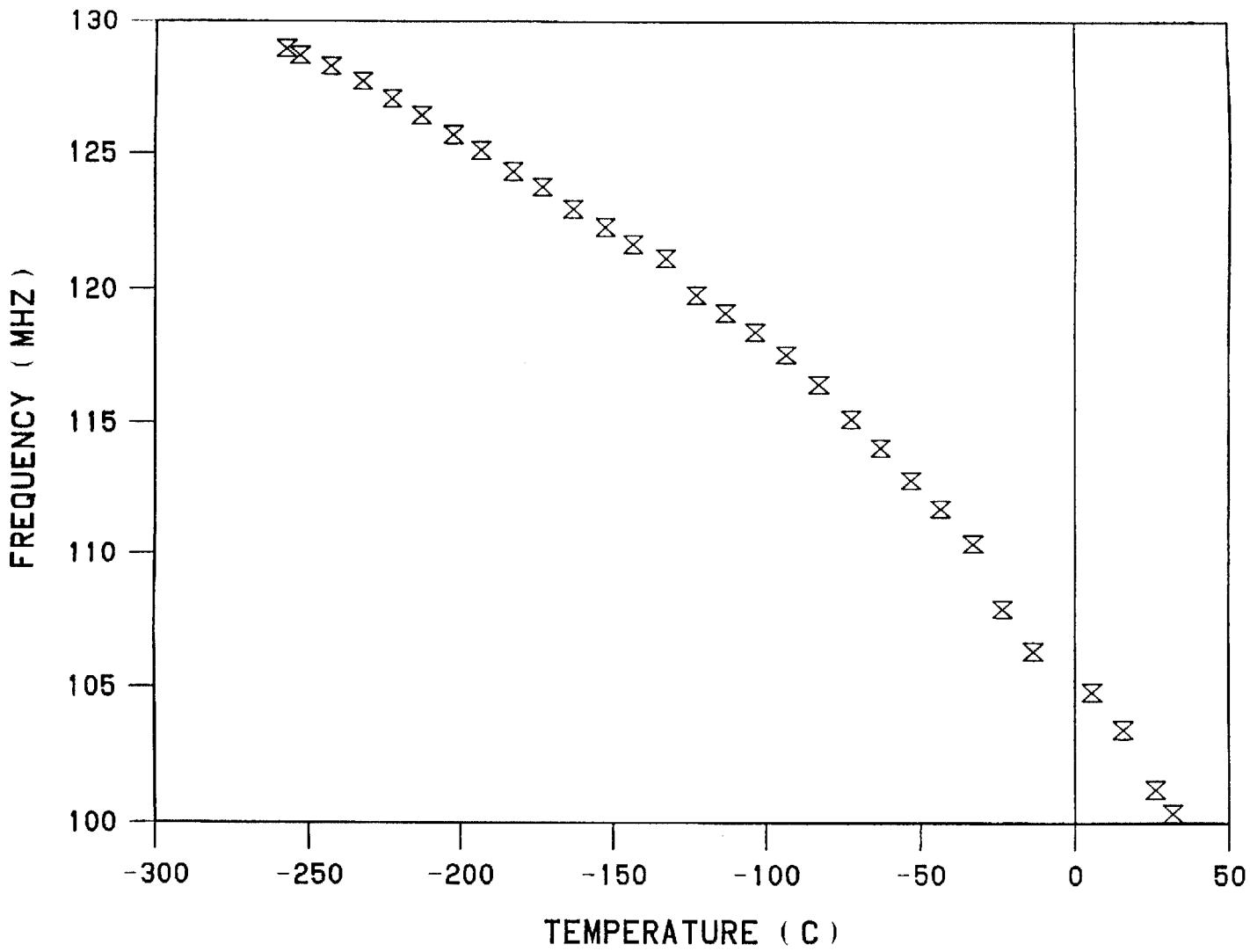
FIG. 4 is an example of ring oscillator frequency versus temperature for lower temperatures.

Referring to FIG. 1, a thermometric oscillator 10 comprises an odd number of inverters 12 connected serially in a closed feedback loop. Other arrangements of an odd number of inverters 12 may be used, for example, a single inverter. Generally, a greater number of inverters has a lower ambient temperature oscillating frequency and a wider frequency variation over a percentage of temperature change than a smaller number of inverters. An optional feedback impedance (not shown) may also be used. As the temperature environment of thermometric oscillator 10 changes, the switching speed of the transistors of which the inverters are comprised changes, causing the oscillating frequency to change. FIGS. 3 and 4 are plots of frequency versus temperature for exemplary ring oscillator circuits. Thermometric ring oscillator 10 may be miniaturized by standard microelectronic fabrication techniques. Miniaturized thermometric oscillator 10 may be placed in close proximity to the point where a temperature measurement is desired, for example, on an integrated circuit microchip to ensure optimum thermal coupling. The nominal oscillating frequency of thermometric oscillator 10 may readily be measured to 1 part in $10^{11}$, thus making possible extremely precise temperature measurements.

An antenna 14 may be located at a convenient location to transform electromagnetic radiation from thermometric oscillator 10 into an electrical signal. A receiver 16 is connected to antenna 14 to receive the electrical signal, measure the frequency of the signal, and determine the corresponding temperature of thermometric oscillator 10. The temperature may be determined, for example, from a lookup or calibration table. The temperature may be presented on a display 18 or from an output 19 in digital or analog form to other devices.

Figure 2:
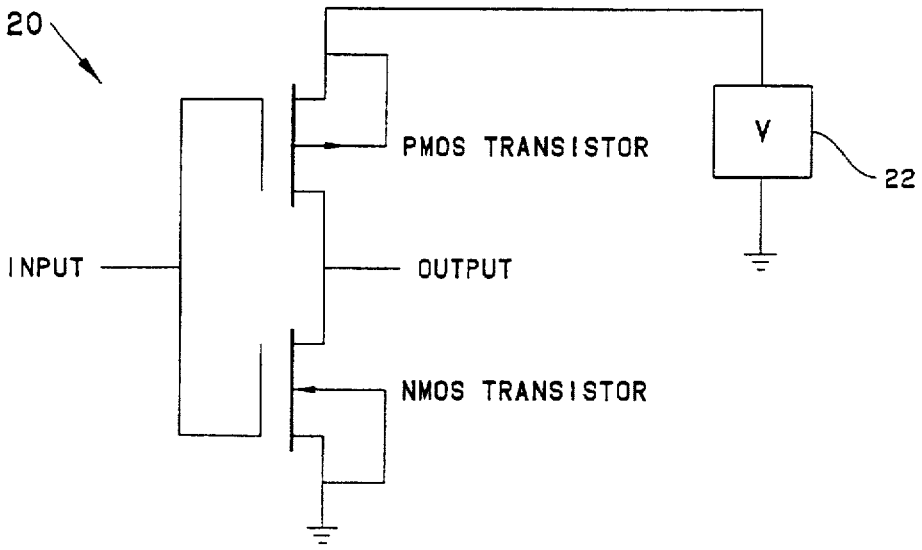
FIG. 2 is a detailed circuit diagram of a single inverter.

FIG. 2 shows a detailed circuit diagram of an exemplary inverter 20 that may be used for making thermometric ring oscillator 10 in FIG. 1. A voltage source 22 biases inverter 20 to operate as an amplifier. Other oscillator circuits may be used, such as junction transistor circuits. The nominal oscillating frequency may be chosen to accommodate a wide variety of applications by selecting the number of inverters comprising thermometric ring oscillator 10, and may range over the frequency spectrum from about 100 GHZ down to the sub-audio frequency range of about 1 Hz. A typical range for the nominal oscillating frequency is from about 10 MHZ to about 150 MHZ. Changes in temperature may be detected by measuring the corresponding changes in the nominal oscillating frequency. Exemplary values of oscillating frequency versus temperature for thermometric ring oscillator 10 are plotted in FIGS. 3 and 4.

Other modifications, variations, and applications of the present invention may be made in accordance with the above teachings other than as specifically described to practice the invention within the scope of the following claims.

We claim:

1. A device for remotely measuring a temperature at a selected location, comprising:

a ring oscillator having a nominal frequency that changes with changes in said temperature, wherein said oscillator is operably coupled to said location, and wherein said oscillator emits electromagnetic radiation at said frequency;

an antenna operably coupled for transforming said electromagnetic radiation to an electrical signal; and a receiver operably coupled to said antenna for receiving said electrical signal to measure said frequency from said electrical signal for determining said temperature.

2. The device of claim 1, wherein said ring oscillator comprises a number of inverters serially connected in a closed loop.

3. The device of claim 1, wherein said nominal frequency is in the range of approximately 1 Hz to approximately 100 GHZ.

4. The device of claim 1, further comprising a display to display said temperature.

5. The device of claim 1, wherein said receiver outputs said temperature as an analog waveform.

6. The device of claim 1, wherein said receiver outputs said temperature as digital data.

7. The device of claim 1, further comprising a power source operably coupled to said oscillator.

* * * * *